US012754979B2

(12) United States Patent
Bailey et al.

(10) Patent No.: US 12,754,979 B2
(45) Date of Patent: Oct. 6, 2026

(54) REPLICATING SOFTWARE CONTAINERS TO MODEL LICENSE NEEDS

(71) Applicant: International Business Machines Corporation, Armonk, NY (US)

(72) Inventors: Logan Bailey, Atlanta, GA (US); Zachary A. Silverstein, Georgetown, TX (US); Jeremy R. Fox, Georgetown, TX (US); Suman Patra, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 18/595,550

(22) Filed: Mar. 5, 2024

(65) Prior Publication Data

US 2025/0284779 A1 Sep. 11, 2025

(51) Int. Cl.
*G06F 21/10* (2013.01)
*G06F 8/61* (2018.01)

(52) U.S. Cl.
CPC .............. *G06F 21/107* (2023.08); *G06F 8/61* (2013.01)

(58) Field of Classification Search
None
See application file for complete search history.

(56) References Cited

U.S. PATENT DOCUMENTS

| | | | | |
|---|---|---|---|---|
| 7,870,044 | B2 | 1/2011 | Robertson | |
| 9,311,160 | B2 | 4/2016 | Parker | |
| 10,191,778 | B1 | 1/2019 | Yang | |
| 10,552,586 | B1 * | 2/2020 | Duan | H04L 47/78 |
| 10,671,953 | B1 | 6/2020 | Xu | |
| 10,855,770 | B2 | 12/2020 | Jain | |
| 11,513,781 | B2 | 11/2022 | Nagar | |
| 11,550,625 | B2 | 1/2023 | Nikhil | |
| 12,026,238 | B1 * | 7/2024 | Yembari | G06F 21/105 |
| 12,277,449 | B1 * | 4/2025 | Pathak | G06F 9/5038 |
| 2007/0043860 | A1 * | 2/2007 | Pabari | H04L 41/40 709/224 |
| 2015/0040025 | A1 | 2/2015 | Deklich | |
| 2017/0199990 | A1 * | 7/2017 | Boudreau | G06F 21/105 |
| 2022/0255941 | A1 * | 8/2022 | Sienicki | G06F 21/53 |
| 2024/0195712 | A1 * | 6/2024 | Baheti | H04L 45/745 |

(Continued)

OTHER PUBLICATIONS

Helali et al., "Heuristic-based approach for dynamic consolidation of software licenses in cloud data centers", Published Online Dec. 2021, DOI: 10.5815/ijisa.2021.06.01, 12 pages.

(Continued)

*Primary Examiner* — Jeffrey R Swearingen
(74) *Attorney, Agent, or Firm* — Steven M. Bouknight

(57) ABSTRACT

A computer-implemented method, a computer system and a computer program product replicate software containers based on established metrics. The method includes receiving a request for installation of a software application in a computing environment. The method also includes identifying a license metric for the software application in the request. In addition, the method includes determining a capacity metric for the computing environment. Lastly, the method includes generating a software container in the computing environment based on the license metric and the capacity metric.

20 Claims, 2 Drawing Sheets

(56) References Cited

U.S. PATENT DOCUMENTS

| | | | | |
|---|---|---|---|---|
| 2024/0348626 | A1 | 10/2024 | Marzorati et al. | |
| 2025/0037139 | A1* | 1/2025 | Dimitrov | G06Q 30/018 |

OTHER PUBLICATIONS

Lin et al., "Ant Colony Algorithm for Multi-Objective Optimization of Container-Based Microservice Scheduling in Cloud", date of current version Jul. 11, 2019, DOI 10.1109/ACCESS.2019.2924414, 13 pages.

Liu et al. "Performance evaluation of containerization in edge-cloud computing stacks for industrial applications: A client perspective", date of current version Feb. 19, 2021, 16 pages.

Shen et al., "X-Containers: Breaking Down Barriers to Improve Performance and Isolation of Cloud-Native Containers", ASPLOS'19, Apr. 13-17, 2019, 15 pages, <https://doi.org/10.1145/3297858.3304016>.

* cited by examiner

REPLICATING SOFTWARE CONTAINERS TO MODEL LICENSE NEEDS

BACKGROUND

Embodiments relate generally to the field of computing, and more particularly modeling software license needs through replication of software containers.

In today's technology environment, individual software installations, or "licenses," may have an impact on an enterprise network either one by one or as a group. This impact may be as important as the features or function of an application to organizations. At the same time, software may be deployed using containers to quickly build and release complex applications and to efficiently model a computing environment. Such replication of software containers may provide a controlled simulation of conditions in the environment for modelling software license needs.

SUMMARY

An embodiment is directed to a computer-implemented method for replicating software containers based on established metrics. The method may include receiving a request for installation of a software application in a computing environment. The method may also include identifying a license metric for the software application in the request. In addition, the method may include determining a capacity metric for the computing environment. Lastly, the method may include generating a software container in the computing environment based on the license metric and the capacity metric.

In another embodiment, the method may include displaying to a user one or more of: the license metric and the capacity metric. In this embodiment, the method may also include and monitoring interactions of the user with the one or more of: the license metric and the capacity metric and modifying the software container based on the interactions of the user.

In a further embodiment, the generating the software container in the computing environment may use a machine learning model that predicts consumption of computing resources based on one or more of: the license metrics and the capacity metrics.

In still another embodiment, the method may include determining a traffic level of the computing environment and modifying the software container based on the traffic level of the computing environment.

In yet another embodiment, the method may include generating a performance report for the software container that includes the traffic level and a recommendation for the license metrics. In an additional embodiment, the software container may comprise a virtual machine.

In another embodiment, the computing environment may comprise a test computing environment that is distinct from a production environment.

In addition to a computer-implemented method, additional embodiments are directed to a computer system and a computer program product for replicating software containers based on established metrics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In today's commercial technology ecosystem, it may be common for organizations to purchase individual software applications, either alone or in software bundles, and install the applications in computing environments that they control. These software application installations may be licensed individually or as a group, and the transaction may include many licenses. In such a scenario, software licenses may have a direct impact on the computing environment through user traffic and other network benchmarks that may be at least as significant to the organization as the potential productivity, e.g., the features or function, of the software. As a result, organizations place a priority on understanding the full impact of software applications to their computing environment before and during a decision on adding software applications to their environment.

It may therefore be useful to provide a method or system to use known or obtained information about a computing environment and the licensing needs of a software application to model the behavior of a software application in an organization's computing environment. It is now common for software to be delivered using containerization, or the packaging of software code with just the operating system (OS) libraries and dependencies required to run the code to create a single lightweight executable, i.e., a "container", that runs consistently on any infrastructure. More portable and resource-efficient than virtual machines (VMs), containers have become the de facto compute units of modern cloud-native applications. The method or system may create a software container based on licensing metrics of a software application, such as usage or compatibility of the application, along with known or obtained information about the computing environment that would host the application, such as an installed hardware base or nodes in an enterprise network. The software container may be used as a test case, or model, of the behavior of the software application, and attributes such as user traffic may be monitored and analyzed to evaluate the software application in the computing environment. Also important to the method or system may be the ability for a user or administrator to configure the software container manually to customize the operating conditions and provide feedback to a machine learning mechanism. Such a method or system may bring efficiency in the software procurement process and allow administrators and users to gain overall insight on impacts to the computing environment that may not be readily available in the current technology landscape.

Figure 1:
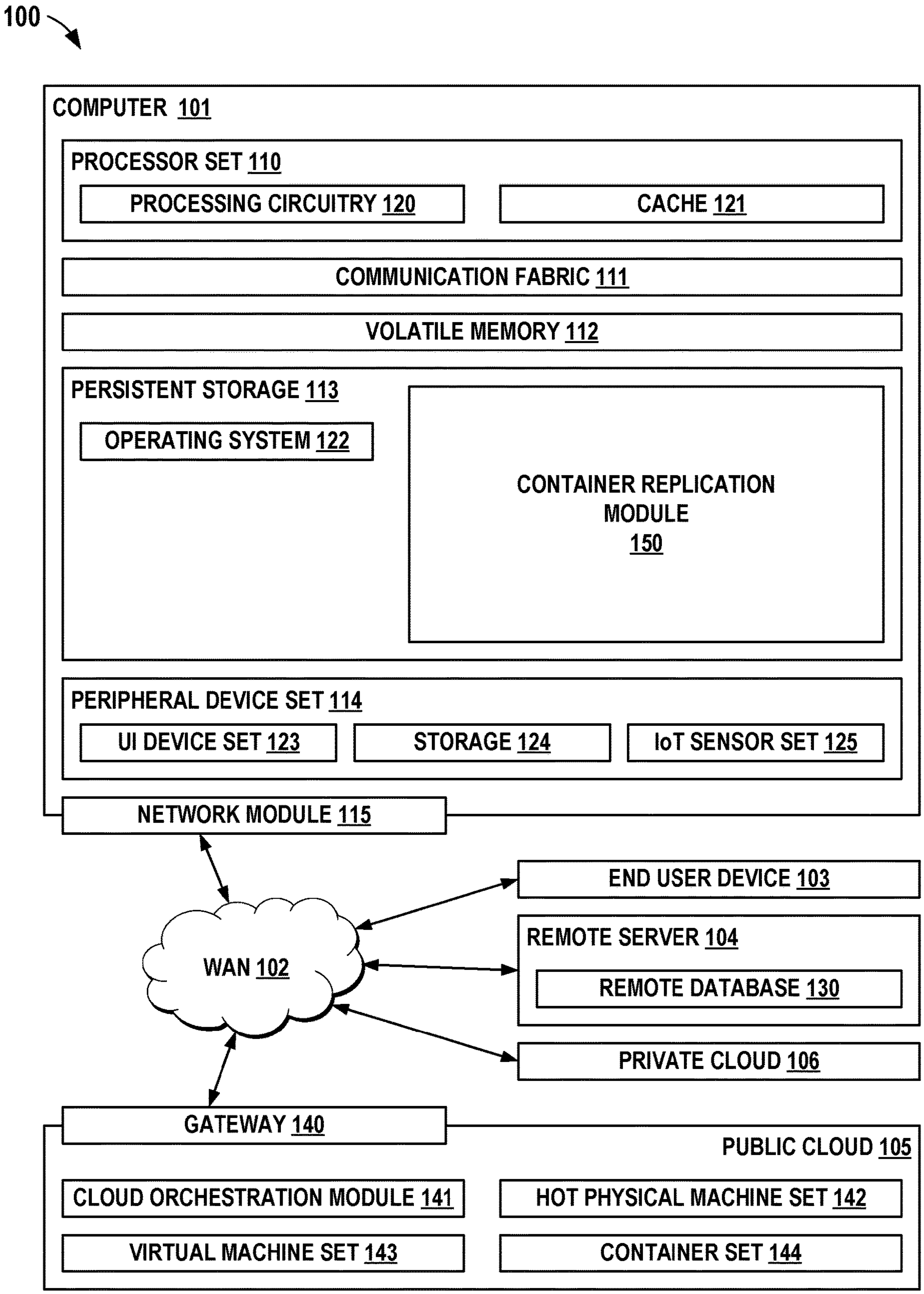
FIG. 1 depicts a block diagram of an example computer system in which various embodiments may be implemented.

Referring to FIG. 1, computing environment 100 contains an example of an environment for the execution of at least some of the computer code involved in performing the inventive methods, such as container replication module 150. In addition to container replication module 150, computing environment 100 includes, for example, computer 101, wide area network (WAN) 102, end user device (EUD) 103, remote server 104, public cloud 105, and private cloud

106. In this embodiment, computer 101 includes processor set 110 (including processing circuitry 120 and cache 121), communication fabric 111, volatile memory 112, persistent storage 113 (including operating system 122 and container replication module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in container replication module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in container replication module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to replicate software containers based on established metrics. In particular, container replication module 150 may receive a request to install software in a computing environment. The request may be a manual request, such as a user or administrator requesting that software be added to the environment or that access be granted for one or more users to a software application within the computing environment. Alternatively, there may be a request generated by an automated process or entity, such as detecting additional users of an existing software application and the need to add licenses to support the additional users. The container replication module 150 may identify license metrics from the request, such as a number of users or nodes required to operate the software at the level desired of the organization or a number of licenses already consumed of a product against the requirements for additional users or nodes. Using known or obtained information about the computing environment, e.g., number of users or devices already connected to an enterprise network or other policies of an organization, the container replication module 150 may determine capacity metrics for the computing environment. The identified license metrics may be combined with the determined capacity metrics to generate a software container that may simulate instances of the software being installed in the computing environment, such as mock traffic between nodes and users in an enterprise network and a resource load on the computing environment. Such a software container that may be generated would also be user configurable, such that an administrator or user may customize the software container to simulate conditions that the license and capacity metrics may not anticipate.

Figure 2:
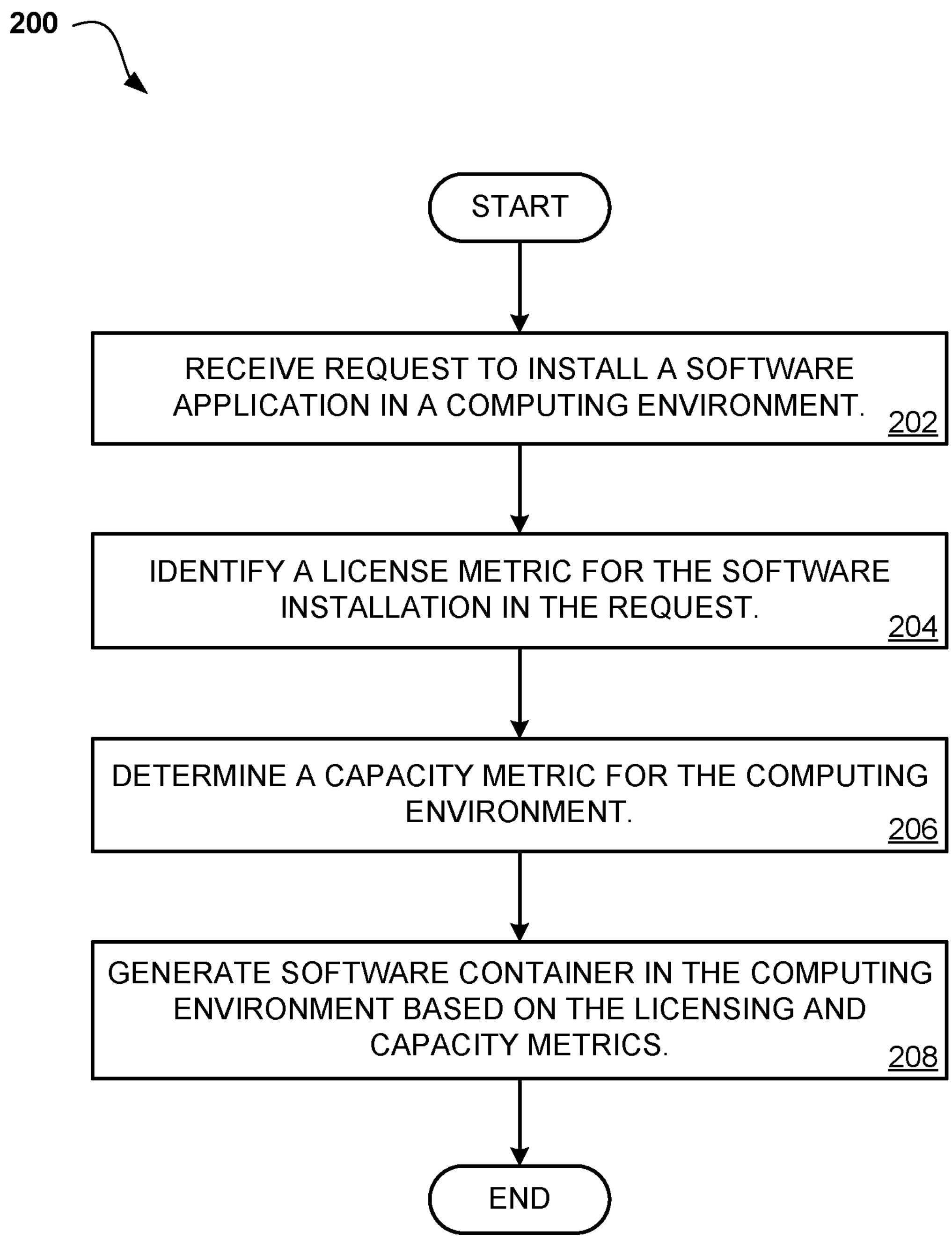
FIG. 2 depicts a flow chart diagram for a process to replicate software containers based on established metrics according to an embodiment.

Referring to FIG. 2, an operational flowchart illustrating a process 200 that replicates software containers based on established metrics is depicted according to at least one embodiment. At 202, the container replication module 150 may receive a request that has been made to install a software application in a computing environment. As mentioned above, the request may be manually initiated by an administrator or user or may be initiated by an automated process. In either case, the request may be detected by the container replication module 150 and inspected according to the process 200. As an example, an organization may have an overall computing environment with hardware nodes supporting a software development environment, a software test environment and a production environment with multiple users in each environment. The organization may evaluate a new application that could run in one or more of these environments and need to understand a "licensing cost" based on how the hardware nodes are allocated within each of the environments. In this case, a formal request may not be made but the container replication module 150 may be alerted to the need for a software container that replicates the operation of the software in the computing environment.

At 204, the container replication module 150 may identify one or more license metrics for the software application in the request. In the example above, the license metrics may be equivalent to the "licensing cost" of the application and include many different attributes related to licensing of the application. For example, it may be known that an organization currently consumes various products from a developer and wishes to look at another application in the suite. The organization may have consumed a portion of available licenses, e.g., 20 out of 30 possible licenses, and wants to know how to allocate further licenses. License metrics may also be related to computing resources that may be required to operate a software application. One of ordinary skill in the art will recognize that there are many metrics that may be identified and it is only required that the metrics refer to the scope of the software as it would run in a computing environment, including a required number of users or minimum hardware requirements for a single instance of the software application or for infrastructure needed to support the software application in a computing environment.

At 206, the container replication module 150 may determine capacity metrics for the computing environment based upon known or obtained information. As an example, the organization may have a known number of hardware nodes or users in one or more computing environments, e.g., the development, test and production environments described above. As described herein, capacity metrics may include network and computing resources of an organization, including specifications of hardware nodes that may be deployed and information about users and clients that may be connected to the network or operating in the computing environment. The computing environment may be a single overall environment or may refer to separate computing environments that may exist. Examples of attributes that may be used as capacity metrics may include CPU usage, network bandwidth or user traffic levels or system memory. One of ordinary skill in the art will recognize that there are various metrics that may be identified as capacity metrics and it is only required that these metrics refer to known or obtained information about the computing environment itself for the purposes of simulating the operation of software applications within the computing environment. As discussed in the examples above, it is important to note that a computing environment, as described herein, is not limited to a specific type of computing environment, such as production or test or development.

At 208, the container replication module 150 may generate or replicate a software container, e.g., a virtual machine (VM), based on the license metrics for the software application and the capacity metrics for the computing environment. In an embodiment, the software container may be initially replicated using the license metrics and the capacity metrics, but the attributes of the software container may be configurable by the user or an automated process to more accurately reflect conditions that may be indicated by the metrics. It is important to note that while the metrics may produce a simulation of the software based on hardware requirements, evaluation of an application may also extend to features of the software as licensed, such that the features may also be tested and evaluated by the organization. In the case of the license metrics, a footprint ranging from small to medium to large may be determined based on how licenses may be currently used or projected. For instance, a software application may only need a license for a single user and only a subset of users may be needed but another application may need to be licensed at a server level along with each user or another scheme that may require a greater number of instances and thus more network traffic. A generic footprint may be determined using benchmarking, where global benchmarks may be decided from a user perspective using common methods and where benchmarking is intended to establish some statistical confidence in performance probabilities.

In an embodiment, a supervised machine learning model may be trained to predict consumption of computing resources based on one or more of: the license metrics and the capacity metrics. One or more of the following machine learning algorithms may be used: logistic regression, naive Bayes, support vector machines, deep neural networks, random forest, decision tree, gradient-boosted tree, multilayer perceptron. One of ordinary skill in the art will recognize that this is a non-limiting list of algorithms that may be used at this step. In an embodiment, an ensemble machine learning technique may be employed that uses multiple machine learning algorithms together to assure better classification when compared with the classification of a single machine learning algorithm. In this embodiment, training data for the model may comprise prior software installations or evaluations on any computing environment, which may include the computing environment where software may be currently evaluated but which is not required. In addition, the training data may also include general function of the computing environment over and above specific software applications that may be running. For instance, a task that may be the focus of the application may be used to determine the license metrics or capacity metrics, e.g., certain busy times of day or specific types of users that may wish to evaluate the software application. The results may be stored in a database so that the data is most current, and the output would always be up to date.

The container replication module 150 may gain an understanding of the software through the licensing metrics for the application, such as a number of nodes required to run the software or a minimum number of users for a specific tier of the application or hardware requirements and computing resources needed to run the software in order to replicate the software application accurately. At the same time, the capacity metrics may provide a specific understanding of the computing environment and the organization, such as how an enterprise network is configured or a method of deploying hardware or organization of users. Both the license metrics and capacity metrics are not required to be static, in that the container replication module 150 may monitor user traffic levels and other network or computing environment attributes as the software container interacts with the computing environment to modify and customize the software container. In addition, the software container may be manually configurable, such that a user, e.g., an administrator, or an automated process may review the license metrics and the capacity metrics to provide feedback and adjust the metrics, and thus the software container, based on the feedback.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for replicating software containers based on established metrics, the computer-implemented method comprising:
- receiving a request for installation of a software application in a computing environment;
- identifying a license metric for the software application in the request, wherein the license metric includes licensing information and further refers to a scope of the software application as would run in the computing environment;
- determining a capacity metric for the computing environment, wherein the capacity metric includes network and computing resources of an organization, specifications of hardware nodes that would be deployed and information about users and clients connected to the network;
- generating a software container in the computing environment based on the license metric and the capacity metric; and
- simulating, via the software container, installation and operation of the software application in the computing environment based on a combination of the license metric and the capacity metric, the simulation including mock traffic between the hardware nodes and the users in an enterprise network, and wherein the simulating further comprises determining a footprint for the software application to identify how many licenses the organization needs for the users by benchmarking use of the software application from a user perspective.

2. The computer-implemented method of claim 1, further comprising:
- displaying to a user one or more of: the license metric and the capacity metric;
- monitoring interactions of the user with the one or more of: the license metric and the capacity metric; and
- modifying the software container based on the interactions of the user.

3. The computer-implemented method of claim 1, wherein the generating the software container in the computing environment uses a machine learning model that predicts consumption of the computing resources based on one or more of: the license metrics and the capacity metrics.

4. The computer-implemented method of claim 1, further comprising:
- determining a traffic level of the computing environment; and
- modifying the software container based on the traffic level of the computing environment.

5. The computer-implemented method of claim 4, further comprising generating a performance report for the software container that includes the traffic level and a recommendation for the license metrics.

6. The computer-implemented method of claim 1, wherein the software container comprises a virtual machine.

7. The computer-implemented method of claim 1, wherein the computing environment comprises a test computing environment that is distinct from a production environment.

8. A computer system for replicating software containers based on established metrics, the computer system comprising:

one or more processors, one or more computer-readable memories, and one or more computer-readable storage media;

program instructions, stored on at least one of the one or more computer-readable storage media for execution by at least one of the one or more processors via at least one of the one or more computer-readable memories, to receive a request for installation of a software application in a computing environment;

program instructions, stored on at least one of the one or more computer-readable storage media for execution by at least one of the one or more processors via at least one of the one or more computer-readable memories, to identify a license metric for the software application in the request, wherein the license metric includes licensing information and further refers to a scope of the software application as would run in the computing environment;

program instructions, stored on at least one of the one or more computer-readable storage media for execution by at least one of the one or more processors via at least one of the one or more computer-readable memories, to determine a capacity metric for the computing environment, wherein the capacity metric includes network and computing resources of an organization, specifications of hardware nodes that would be deployed and information about users and clients connected to the network;

program instructions, stored on at least one of the one or more computer-readable storage media for execution by at least one of the one or more processors via at least one of the one or more computer-readable memories, to generate a software container in the computing environment based on the license metric and the capacity metric; and program instructions, stored on at least one of the one or more computer-readable storage media for execution by at least one of the one or more processors via at least one of the one or more computer-readable memories, to simulate, via the software container, installation and operation of the software application in the computing environment based on a combination of the license metric and the capacity metric, the simulation including mock traffic between the hardware nodes and the users in an enterprise network, and wherein the simulating further comprises determining a footprint for the software application to identify how many licenses the organization needs for the users by benchmarking use of the software application from a user perspective.

9. The computer system of claim 8, further comprising:

program instructions, stored on at least one of the one or more computer-readable storage media for execution by at least one of the one or more processors via at least one of the one or more computer-readable memories, to display to a user one or more of: the license metric and the capacity metric;

program instructions, stored on at least one of the one or more computer-readable storage media for execution by at least one of the one or more processors via at least one of the one or more computer-readable memories, to monitor interactions of the user with the one or more of: the license metric and the capacity metric; and program instructions, stored on at least one of the one or more computer-readable storage media for execution by at least one of the one or more processors via at least one of the one or more computer-readable memories, to modify the software container based on the interactions of the user.

10. The computer system of claim 8, wherein generating the software container in the computing environment uses a machine learning model that predicts consumption of the computing resources based on one or more of: the license metrics and the capacity metrics.

11. The computer system of claim 8, further comprising:

program instructions, stored on at least one of the one or more computer-readable storage media for execution by at least one of the one or more processors via at least one of the one or more computer-readable memories, to determine a traffic level of the computing environment; and program instructions, stored on at least one of the one or more computer-readable storage media for execution by at least one of the one or more processors via at least one of the one or more computer-readable memories, to modify the software container based on the traffic level of the computing environment.

12. The computer system of claim 11, further comprising program instructions, stored on at least one of the one or more computer-readable storage media for execution by at least one of the one or more processors via at least one of the one or more computer-readable memories, to generate a performance report for the software container that includes the traffic level and a recommendation for the license metrics.

13. The computer system of claim 8, wherein the software container comprises a virtual machine.

14. The computer system of claim 8, wherein the computing environment comprises a test computing environment that is distinct from a production environment.

15. A computer program product for replicating software containers based on established metrics, the computer program product comprising:

one or more computer-readable storage media;

program instructions, stored on at least one of the one or more computer-readable storage media, to receive a request for installation of a software application in a computing environment;

program instructions, stored on at least one of the one or more computer-readable storage media, to identify a license metric for the software application in the request, wherein the license metric includes licensing information and further refers to a scope of the software application as would run in the computing environment;

program instructions, stored on at least one of the one or more computer-readable storage media, to determine a capacity metric for the computing environment, wherein the capacity metric includes network and computing resources of an organization, specifications of hardware nodes that would be deployed and information about users and clients connected to the network;

program instructions, stored on at least one of the one or more computer-readable storage media, to generate a software container in the computing environment based on the license metric and the capacity metric; and program instructions, stored on at least one of the one or more computer-readable storage media, to simulate, via the software container, installation and operation of the software application in the computing environment based on a combination of the license metric and the capacity metric, the simulation including mock traffic between the hardware nodes and the users in an enterprise network, and wherein the simulating further comprises determining a footprint for the software application to identify how many licenses the organization needs for the users by benchmarking use of the software application from a user perspective.

16. The computer program product of claim 15, further comprising:

program instructions, stored on at least one of the one or more computer-readable storage media, to display to a user one or more of: the license metric and the capacity metric;

program instructions, stored on at least one of the one or more computer-readable storage media, to monitor interactions of the user with the one or more of: the license metric and the capacity metric; and program instructions, stored on at least one of the one or more computer-readable storage media, to modify the software container based on the interactions of the user.

17. The computer program product of claim 15, wherein generating the software container in the computing environment uses a machine learning model that predicts consumption of the computing resources based on one or more of: the license metrics and the capacity metrics.

18. The computer program product of claim 15, further comprising:

program instructions, stored on at least one of the one or more computer-readable storage media, to determine a traffic level of the computing environment; and program instructions, stored on at least one of the one or more computer-readable storage media, to modify the software container based on the traffic level of the computing environment.

19. The computer program product of claim 18, further comprising program instructions, stored on at least one of the one or more computer-readable storage media, to generate a performance report for the software container that includes the traffic level and a recommendation for the license metrics.

20. The computer program product of claim 15, wherein the software container comprises a virtual machine.

* * * * *